United States Patent [19]
Vishlitzky et al.

[11] Patent Number: 5,809,332
[45] Date of Patent: Sep. 15, 1998

[54] SUPPLEMENTAL COMMUNICATION BETWEEN HOST PROCESSOR AND MASS STORAGE CONTROLLER USING MODIFIED DIAGNOSTIC COMMANDS

[75] Inventors: Natan Vishlitzky; Erez Ofer, both of Brookline, Mass.

[73] Assignee: EMC Corporation, Hopkinton, Mass.

[21] Appl. No.: 657,341

[22] Filed: Jun. 3, 1996

[51] Int. Cl.[6] ................................................... G06F 13/00
[52] U.S. Cl. ................................................ 395/835; 395/500
[58] Field of Search ..................................... 395/500, 180, 395/825, 835, 839, 507, 183.03

[56] References Cited

U.S. PATENT DOCUMENTS

| | | | |
|---|---|---|---|
| 5,150,465 | 9/1992 | Bush et al. | 395/834 |
| 5,361,346 | 11/1994 | Panesar et al. | 395/183.13 |
| 5,428,714 | 6/1995 | Yawata et al. | 395/112 |
| 5,530,960 | 6/1996 | Parks et al. | 395/825 |
| 5,694,618 | 12/1997 | Hibino | 395/866 |

FOREIGN PATENT DOCUMENTS

| | | | |
|---|---|---|---|
| 0 569 313 AS | 11/1993 | European Pat. Off. | G06F 3/06 |
| WO/92/15054 | 9/1992 | WIPO | G06F 3/06 |

*Primary Examiner*—Dinh C. Dung
*Attorney, Agent, or Firm*—Fish & Richardson P.C.

[57] ABSTRACT

A mass storage system has a host computer connecting over a standard bus to a storage controller. The storage controller connects also to an array of disk drives. The host computer and the storage controller modify standard bus diagnostic commands for transmitting selected, non-diagnostic commands, and responses to each other. In this manner, a standard bus protocol is expanded to enable a host computer and storage controller to communicate, for example, configuration data, status, and some command information, particularly enabling the user at the host computer to control operational aspects of the storage controller.

10 Claims, 3 Drawing Sheets

'SOUND DIAGNOSTICS' ID'

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | COMMAND CODE  $1D ||||||||
| BYTE 1 | LOGGICAL UNIT NUMBER ||| PF | R | SELFTST | DEVOFL | UNITOFL |
| BYTE 2 | CKD | CHAIN | WRITE | FEATURE FLAGS |||||
| BYTE 3 | PARAMETERS LENGTH MSB ||||||||
| BYTE 4 | PARAMETERS LENGTH LSB ||||||||
| BYTE 5 | CONTROL BYTE ||||||||

FIG. 2A

'SEND DIAGNOSTICS' PARAMETER HEADER (LENGTH 8)

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 - 2 | PASSWORD 'EMC' ||||||||
| BYTE 3 | FEATURE NUMBER  (ABOVE LIST) ||||||||
| BYTE 4 - 5 | CHAIN CODE  (AGAINST MIXING JOBS) ||||||||
| BYTE 6 - 7 | EXTRA PARAMETERS LENGTH ||||||||

FIG. 2B

'SEND DIAGNOSTICS' PARAMETER (LENGTH N)

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 - N-1 | PARAMETERS / DATA ||||||||

FIG. 2C

RECEIVE DIAGNOSTIC RESULTS  '1C'

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | COMMAND CODE  $1C ||||||||
| BYTE 1 | LOGGICAL UNIT NUMBER ||| RESERVD |||||
| BYTE 2 | CKD | E CHN | READ | SENSE | FEATURE FLAGS ||||
| BYTE 3 | PARAMETERS LENGTH MSB ||||||||
| BYTE 4 | PARAMETERS LENGTH LSB ||||||||
| BYTE 5 | CONTROL BYTE ||||||||

FIG. 2D

RECEIVE DIAGNOSTIC RESULTS  PARAMETER HEADER  (LENGTH 8)

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | RETURN CODE ||||||||
| BYTE 1 - 2 | RETURN CODE MODIFIERS ||||||||
| BYTE 3 | FEATURE NUMBER  (ABOVE LIST) ||||||||
| BYTE 4 - 5 | CHAIN CODE  (AGAINST MIXING JOBS) ||||||||
| BYTE 6 - 7 | EXTRA PARAMETERS LENGTH ||||||||

FIG. 2E

RECEIVE DIAGNOSTIC RESULTS  PARAMETER (LENGTH N)

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 - N-1 | PARAMETERS / DATA ||||||||

FIG. 2F

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | COMMAND $28 ||||||||
| BYTE 1 | LOGICAL UNIT NUMBER ||| DPO | FUA | RT | RTI | RELADR |
| BYTE 2 - 5 | LOGICAL BLOCK ADDRESS ||||||||
| BYTE 6 | SESSION ID ||||||||
| BYTE 7 - 8 | TRANSFER LENGTH ||||||||
| BYTE 9 | CONTROL BYTE ||||||||

FIG. 2G bai# SUPPLEMENTAL COMMUNICATION BETWEEN HOST PROCESSOR AND MASS STORAGE CONTROLLER USING MODIFIED DIAGNOSTIC COMMANDS The invention relates generally to mass storage systems, and in particular, to the communications network between the host computer and the mass storage controller.

To meet the growing requirements of today's computer systems, and, simultaneously, to satisfy the growing demands of customers to have more control over their mass storage systems, it has become desirable to provide customers with the ability to communicate, through the host, with the mass storage controller, and further, to modify the controller's characteristics and configuration. Previously, such control capability was available only to a customer engineer travelling to the site, or through a modem connection between a central service bureau location and the customer site. In the former instance, the customer engineer, at the site, would communicate with the controller to both diagnose and correct problems at the controller as well as modify or otherwise affect the various functional and configurational aspects of controller operation. In the later instance, a service engineer at the remote service site effects the same operations, through a modem connection to a personnel computer at the customer site.

While the traditional approach, whereby diagnostic and corrective action was taken by the customer engineer sitting either at the user's site, or at a central service bureau, was effective to implement all necessary procedures, nevertheless users have consistently urged and requested the ability to perform some of those same functions themselves, for example the ability to affect operation of the mass storage controller as it interfaces with a plurality of disk drives.

At the same time, however, the need for using standard, industry recognized, non-proprietary systems and protocols for communications between the controller and the host continues to grow. Such standards based systems, for example the use of a SCSI protocol, are well defined for communications between host and disk drive. However, the ability to add special function commands to the SCSI protocol, for example, is not intended by the protocol itself.

SUMMARY OF THE INVENTION

The invention relates to a method and apparatus for effecting communications between a host processor and a mass storage controller where, in ordinary circumstances, these elements communicate using an industry standard protocol, such as a SCSI protocol.

Such a mass storage system features a mass storage array having a plurality of mass storage devices, such as disk drives; a storage controller for receiving and sending data from and to the storage devices; a host computer connected to a standard based communications bus for communicating data and commands with the storage controller, the storage controller also being connected to the standards based bus for communicating data and commands with the host, the host modifying a first standards based protocol command for transmitting selected special function commands to the storage controller, and the storage controller receiving the modified standards commands and transmitting onto the standards based bus a modified standards based protocol command in response to the command received from the host.

In particular embodiments of the invention, the bus is a SCSI bus and the modified SCSI SEND and RECEIVE DIAGNOSTICS commands can include commands for modifying the configuration of the disk array, identification commands, etc.

In a particular aspect of the invention, modified SCSI SEND and RECEIVE DIAGNOSTICS commands are used in combination with a graphical user interface (GUI) for modifying the storage configuration of the mass storage system. In other aspects, the invention can be used to eliminate reservations implemented by a host over a SCSI system (designated a SCSI reservation) in the event that the originating host computer is no longer available.

BRIEF DESCRIPTION OF THE DRAWING

Other features and advantages of the invention will be apparent from the following drawings, taken together with the description of the particular embodiments of the invention, in which:

FIGS. 2A–2G represent a series of DIAGNOSTIC SEND and RECEIVE protocols using modified SCSI commands.

DESCRIPTION OF THE PREFERRED EMBODIMENTS

Figure 1:
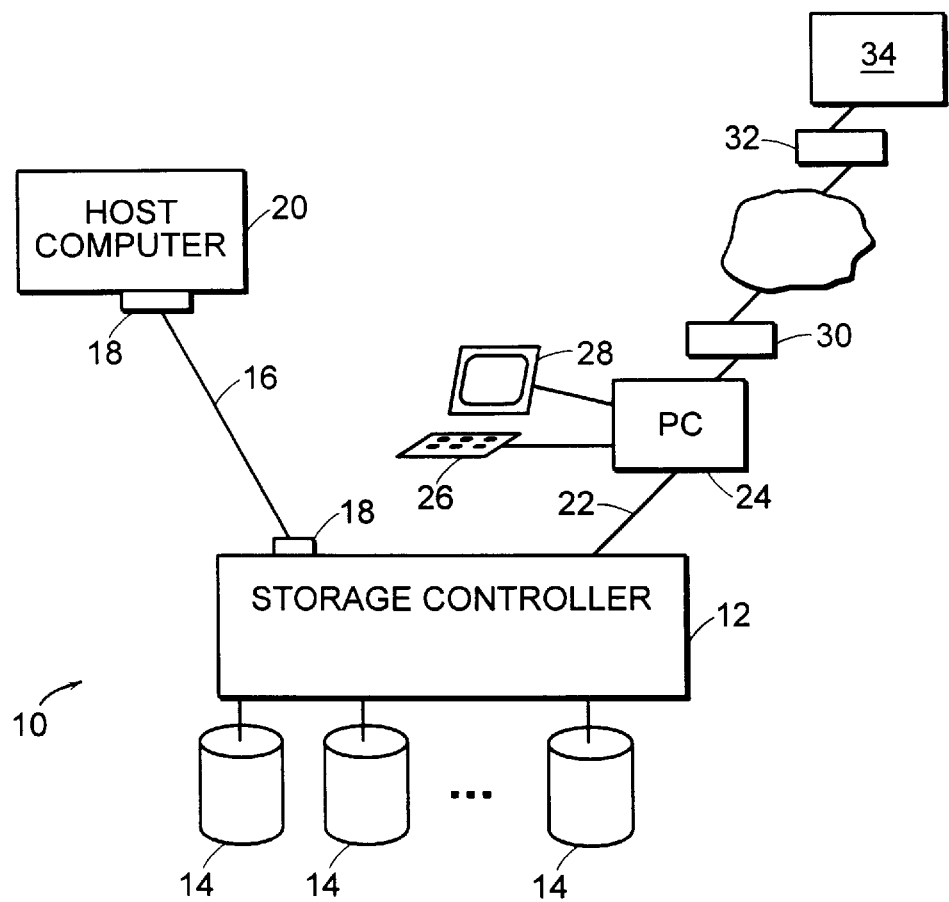
FIG. 1 is a diagrammatic block diagram of a mass storage system with which the invention is useful.

Referring to FIG. 1, a mass storage system 10 in accordance with the invention, has a storage controller 12 connected to a plurality of storage devices, here an array of disk storage devices 14. The storage controller 12 is connected, over a standard communications channel 16, here a SCSI bus, through appropriate terminators 18 to a host computer 20. The storage controller 12 is also connected over a communications path 22 to a personal computer (PC) 24. The personal computer has both a keyboard 26 and a display 28. The keyboard 26 can be used by service personnel to enter configuration, diagnostic, status, correction, and other commands to the PC for controlling the functionality, structure and configuration, and status of the storage controller 12. The PC is also connected through a modem 30 to a remote service bureau having a modem 32. The remote service bureau has a remote site computer system 34, which can be, for example, a PC or a workstation, through which commands are entered and by which the PC 24 is operated to control the storage controller 12.

Accordingly, when service is requested by the user through a remote service site or a customer engineer appearing at the user site, the PC 24 always acts as the source of the command data to the controller and the commands are sent to the storage controller over communication bus lines 22. Since communication bus 22 is implemented specifically to provide a command structure between the PC and the controller, both of which are configured by the same vendor, there is no difficulty in designing that communications structure to incorporate the varying commands necessary to properly diagnose, control, and configure the storage controller. Thus, various commands which, for example, set the array "RAID" configuration, the block size, logical volumes, disk adaptor and channel adaptor software configurations and mappings, etc., which are typical in a storage controller such as that manufactured by EMC Corporation, the assignee of this application, under the trademark Symmetrix, are well known and established in the art. From the perspective of the storage controller, it is immaterial whether the data and command entry is performed from the PC keyboard 26 or through the modem 30 from the remote site computer 34.

In accordance with a preferred embodiment of the invention, and as desired for industry compatibility, the bus 16 between the host and the storage controller is a standard bus, a SCSI bus operating in accordance with the SCSI protocol being described in connection with the illustrated embodiment of the invention. (Other standard buses could be used.) This protocol does not provide for commands particularly useful in operating the storage controller (as opposed to transferring data to and from a disk drive) such as commands for reconfiguring the storage, a SCSI adaptor write protection command, commands identifying events to be alerted for, commands for RDF contention, commands for statistics monitoring, etc.

Since the SCSI protocol does not provide commands for these special functions, a different communication mechanism, or an additional communication mechanism needed to be found. In accordance with the invention, therefore, and in accordance with the illustrated SCSI protocol, a series of special command functions are implemented, which are both compatible with the bus protocol and yet are not part of the protocol. The illustrated embodiment of the invention employs a modification of the SEND DIAGNOSTIC command to implement a plurality of special features commands which are available for transmission from the host to the storage controller 12 and to which the storage controller will respond using a modified set of the RECEIVE DIAGNOSTIC RESULTS command.

In accordance with a particular embodiment of the invention, the features which are preferably implemented are: a "get controller data" command which responds to the host's questions about the controller configuration, that is, the configuration of the controllers, devices, cache, etc.; the controller "inlines" command which implements the controller "inlines" with the same specifications and parameters format as the controller. The controller can be, for example, an EMC Corporation Symmetrix controller.

The process of communications, in accordance with the invention, will generally be performed using two commands linked together. The host computer will send a SEND DIAGNOSTICS command with a header of data and a request for information. If the command requests data or calls for execution of a function, the first command will be linked to a RECEIVE DIAGNOSTIC RESULTS command which provides the results, and which includes a response header and the response data. If the requesting command sends data to the controller, the first command will be linked to another "SEND DIAGNOSTICS" command which will include a header followed by the data.

Referring now to FIG. 2A, the format of the SEND DIAGNOSTICS command (command code "1D"), is illustrated. In this command, which meets the formal SCSI definition, elements "PF" and the "SELFTST" are set equal to zero, and the PARAMETERS LENGTH is set equal to the value 8. These elements are diagrammatically illustrated in FIGS. 2B and 2C.

Referring to FIG. 2D, the RECEIVE DIAGNOSTIC results, command code "1C", is a formal SCSI definition, and uses a PARAMETERS LENGTH equal to "8". Like the SEND DIAGNOSTICS command, the RECEIVE DIAGNOSTIC RESULTS command has a parameter header as illustrated in FIG. 2E as well as a RESULTS PARAMETER illustrated in FIG. 2F for results and data.

Considering the special features commands implemented by the SEND DIAGNOSTICS command in more detail, Feature 0, the "Get Controller Data" command, responds to host questions about the real controller configuration. Command Feature 1, the Controller Inline command, implements the Controller Inlines with the same specification and parameters format. Every command with this feature actually consists of two commands linked together. The first always is the SEND DIAGNOSTICS command with the flag "UNITOFL" set to zero. After the header with this feature number, the host sends 16 bytes of parameters. If the request is for the controller to write data, the second linked "SEND DIAGNOSTICS" SCSI command has the flag "UNITOFL" set to one, and it will have the same header. The data that follows will be with a count according to the first command parameters.

If the request is to read data, the second linked command, "RECEIVED DIAGNOSTIC RESULTS", will have a header and the data that follows will have a count according to the first command parameters. If a utility or test is requested by the first command, the second command will disconnect, execute the requested utility or test, and then return the header in the RECEIVE DIAGNOSTIC RESULTS command with a return code.

The third command, Feature 2, is the controller concurrent copy command. This feature implements the mainframe concurrent copy command with the same specification and parameters format of other commands. The special read commands will use the regular read command, designated in SCSI as the "28" command, using the bits in byte 1 of the SEND DIAGNOSTIC command to define both the "readtrack" or "read track image". In byte 6, the "session ID" is placed. Each linked command dealing with the concurrent copy feature consists of pairs of either the SEND DIAGNOSTIC and RECEIVE DIAGNOSTIC RESULTS commands, and or the READ DATA command. The first command of the pair will replace the pair of commands designated "27" and "3E" in SCSI protocol, from the mainframe. The second command of the pair will cover the read tracks and read sidefile commands for which the system will use a reserved part of the SCSI command labeled "28" which has the format illustrated in FIG. 2G. In this command, the flags in byte 1 connected to the concurrent copy are: "RT" the READ TRACK command, and "RTI" the READ TRACK IMAGE command. In byte 6 is the session ID, connected with the RT and RTI commands. There is no need for a tail for the READ TRACK command because it is always a fixed size. For the READ TRACK IMAGE command, the system sends the header exactly like the mainframe header of a sidefile track.

It is further important to note that in the read controller data command, the system has a command that will obtain the emulation geometry "blocks, tracks, and cylinders" to translate into the concurrent copy tracks. Second, in the SCSI protocol, there is no ability to inform the host about the concurrent copy state with the attention message, so it is a responsibility of the host system to poll the controller about the concurrent copy state.

Feature 4 executes controller commands. Every linked command deals with controller commands and consists of a pair of diagnostic commands, that is, the SEND DIAGNOSTIC and RECEIVE DIAGNOSTIC RESULTS commands.

Accordingly, the illustrated embodiment of the invention advantageously transmits a full complement of commands over the standard SCSI interface by configuring certain of the SCSI diagnostic commands in a manner recognizable by the host and storage controllers as "a special feature group" of commands which enable what is effectively a side channel communications path, operating at high speed, that is, at SCSI speeds. This enables a full range of host activity to take place wherein the host can control various functions of the controller not otherwise available to the host over a standard SCSI interface. These commands include, for example, the ability to ascertain the configuration of the storage controller and its storage elements, the ability to control reservations made by a host at the storage controller, the ability to vary the storage configuration and effect adaptive storage in accordance with the host needs, a SCSI Adapter write protection, the ability of the host to ascertain "event alerts" which occur at the storage controller, and the ability to effect remote disk functions and to control them from the host as opposed to operating through the proprietary channel 22, from the PC. Other functions of course can also be effected.

Additions, subtractions, and other modifications of the described invention will be apparent to those practiced in this field and are within the scope of the following claims.

What is claimed is:

1. A mass storage system comprising:
   a mass storage array having a plurality of mass storage devices,
   a storage controller for receiving and sending data from and to said storage device,
   a host computer connected to a communications bus for communicating data and commands with the storage controller,
   said storage controller being connected to said bus for communicating data and commands with the host computer,
   said host modifying standard bus diagnostic commands for transmitting select, non-diagnostic commands to said storage controller, and
   said storage controller receiving said modified commands, and transmitting modified diagnostic commands to the host over the bus in response to the received modified commands.

2. The mass storage system of claim 1 wherein said modified commands request storage controller configuration information.

3. The mass storage system of claim 1 wherein said modified commands cause execution of controller commands.

4. The mass storage system of claim 1 wherein said modified commands request a controller concurrent copy.

5. The mass storage system of claim 1 wherein said modified commands are derived from a graphic user interface at the host computer.

6. A method for communicating between a host and a mass storage controller comprising the steps of
   receiving at the controller modified standard bus diagnostic commands containing select non-diagnostic commands, and
   transmitting modified diagnostic commands to the host sending the non-diagnostic commands in response to the received modified commands.

7. The method of claim 6 further comprising the step of sending storage controller configuration information to a requesting host in response to said modified commands.

8. The method of claim 6 further comprising the step of executing controller commands in response to said received modified commands.

9. The method of claim 6 further comprising the step of generating a controller concurrent copy in response to said received modified commands.

10. The method of claim 6 further comprising the step of deriving said modified commands from a graphic user interface at the host computer.

* * * * *